(12) United States Patent
Duke

(10) Patent No.: US 6,675,488 B2
(45) Date of Patent: Jan. 13, 2004

(54) ALIGNMENT TOOL SYSTEM AND METHOD

(76) Inventor: Leslie P. Duke, Eight Ridgedale Dr. SE., Silver Creek, GA (US) 30173-2374

(*) Notice: Subject to any disclaimer, the term of this patent is extended or adjusted under 35 U.S.C. 154(b) by 24 days.

(21) Appl. No.: 10/109,136

(22) Filed: Mar. 28, 2002

(65) Prior Publication Data

US 2003/0182814 A1 Oct. 2, 2003

(51) Int. Cl.[7] .............................. G01B 5/255
(52) U.S. Cl. ................... 33/203.18; 33/600; 33/645
(58) Field of Search ..................... 33/203, 203.18, 33/533, 600, 608, 613, 644, 645, 542, 544.4, 520

(56) References Cited

U.S. PATENT DOCUMENTS

| | | | | |
|---|---|---|---|---|
| 129,536 A | * | 7/1872 | Cross | 33/542 |
| 460,434 A | | 9/1891 | Feus | |
| 902,738 A | * | 11/1908 | Jones | 33/520 |
| 1,804,448 A | | 5/1931 | Wochner | |
| 2,098,749 A | | 11/1937 | Johnston | |
| 2,314,582 A | * | 3/1943 | Gerich | 33/645 |
| 3,289,307 A | * | 12/1966 | Kelly | 33/520 |
| 4,096,636 A | | 6/1978 | Little | |
| 4,170,070 A | | 10/1979 | Duchene | |
| 4,172,326 A | | 10/1979 | Henter | |
| 4,413,420 A | | 11/1983 | Hoffman et al. | |
| 4,432,144 A | | 2/1984 | Carlsson | |
| 4,730,399 A | * | 3/1988 | Campbell | 33/203 |
| 4,868,993 A | | 9/1989 | Kvale | |
| 4,922,623 A | | 5/1990 | Aldrich et al. | |
| 4,939,848 A | | 7/1990 | Armstrong | |
| 5,148,377 A | | 9/1992 | McDonald | |
| 5,408,755 A | * | 4/1995 | Russell | 33/608 |
| 5,412,878 A | | 5/1995 | Edman | |
| 5,509,208 A | | 4/1996 | Oja | |
| 5,515,613 A | * | 5/1996 | Hinson | 33/608 |
| 6,240,648 B1 | * | 6/2001 | Dolph | 33/203.18 |

* cited by examiner

Primary Examiner—Christopher W. Fulton
(74) Attorney, Agent, or Firm—Hinkle & O'Bradovich, LLC

(57) ABSTRACT

An alignment apparatus, system and method of alignment for motorcycle is disclosed. The apparatus typically includes an elongated threaded rod and two internally threaded cones that screw onto either end of the rod in opposition. The alignment system typically includes two of the apparatuses, one to be fitted within the rear axle and the other to be fitted within the swing arm pivot shaft. The distance is measured between the ends of the rods on either side of the motorcycle and the rear axle is adjusted until the distances are equal. The rear wheel is then in alignment with the motorcycle.

15 Claims, 3 Drawing Sheets

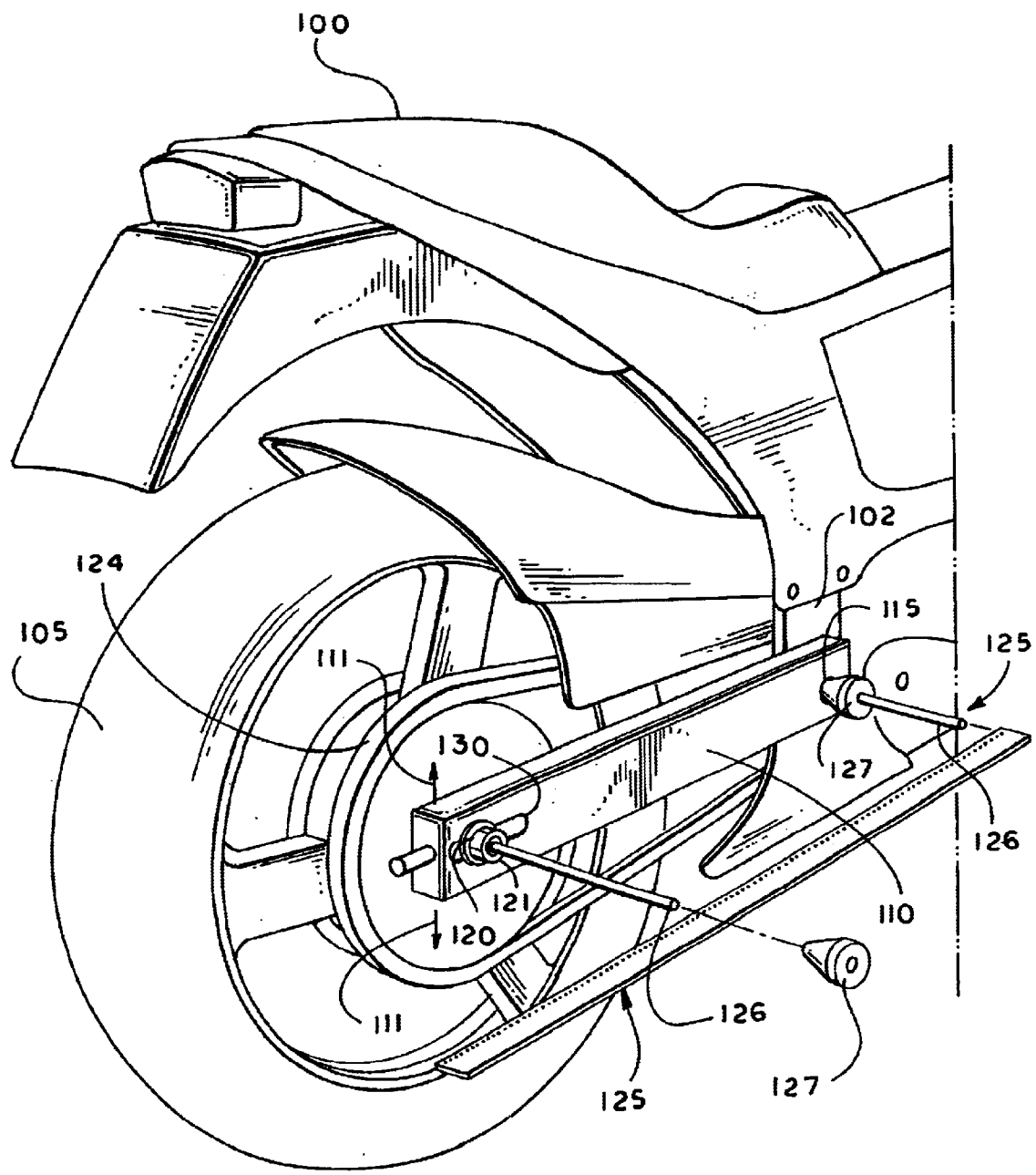
Fig_1

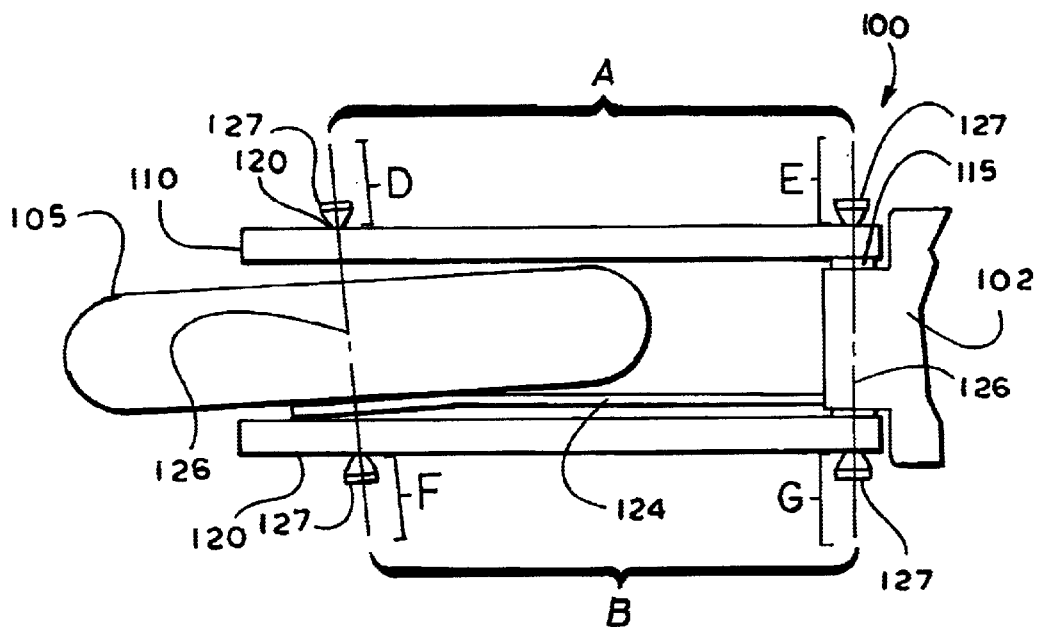
Fig_2
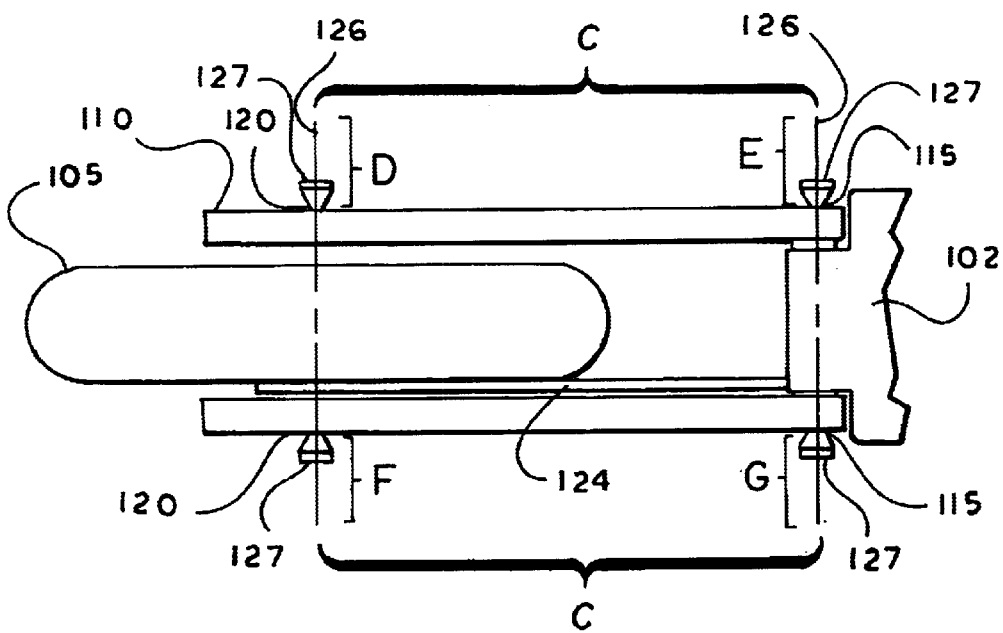
Fig_3

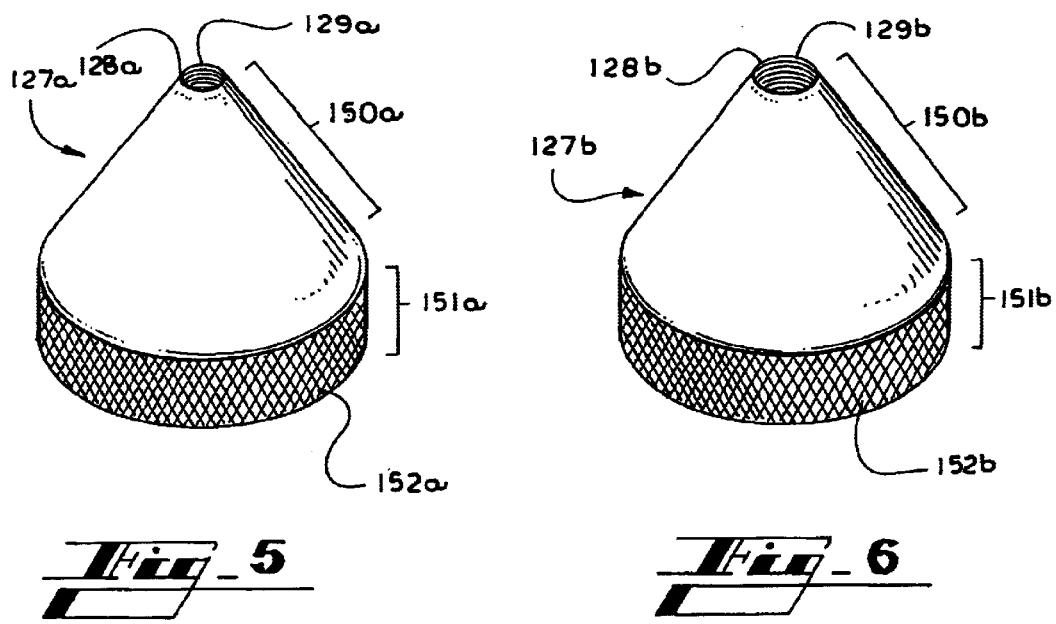
Fig_5    Fig_6
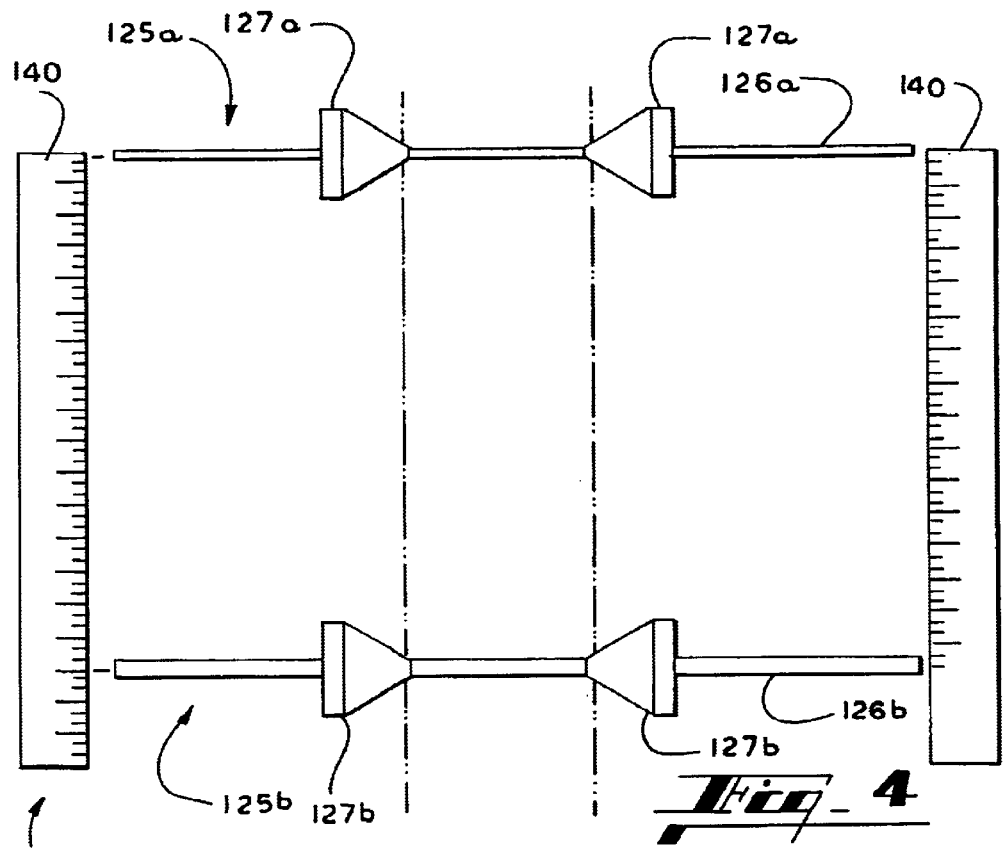
Fig_4

ALIGNMENT TOOL SYSTEM AND METHOD

BACKGROUND OF THE INVENTION

I. Field of the Invention

The present invention relates generally to the field of motorcycle wheel and drive system alignment, and more particularly to an alignment tool apparatus, system and method of alignment.

II. Description of the Related Art

Motorcycles typically include a suspension system that includes a swing-arm that pivots about a swing-arm pivot shaft. The motorcycles also include a rear wheel at the end of the swing-arm opposite the pivot shaft. Motorcycles also include chain tensioners to adjust the tension in the chain. Whenever the rear wheel is removed or the chain adjusted, the rear wheel can come out of alignment with the frame and drive system. The rear wheel can come out of alignment for other reasons such as expected use. When out of alignment, the motorcycle does not operate properly and the tires can wear out faster. Many motorcycle manufacturers include pre-marked notches on the swing-arm that can be used to align the rear wheel. However, these notches are often not marked properly and are often mis-marked as to be out of alignment when the notches are aligned as suggested.

SUMMARY OF THE INVENTION

In accordance with the present invention and the contemplated problems which have and continue to exist in this field, the invention features an alignment apparatus, including an elongated rod having threads along a portion of the rod, a first internally threaded cone connected to the rod and a second internally threaded cone connected to the rod and in opposition to the first conical body.

In one implementation, the cones are in threaded engagement with the rod.

In another implementation, the rod is threaded along its entire length.

In another implementation, each of the cones include a conical portion and a cylindrical portion, the cylindrical portion including a series of grooves along the perimeter of the cylindrical portion.

In another implementation, the internal threads of each of the cones runs the entire length of a hole that runs the entire length of the cone.

In another aspect, the invention features an alignment system, including a first alignment apparatus and a second alignment apparatus, each of the alignment apparatuses including, an elongated rod having threads along a portion of the rod, a first internally threaded cone connected to the rod and a second internally threaded cone connected to the rod and in opposition to the first conical body.

In one implementation, the diameters of the rods of the first and second apparatuses are equal.

In another implementation, the diameters of the rods of the first and second apparatuses are not equal.

In another aspect, the invention features an alignment tool kit, including a first alignment apparatus and a second alignment apparatus, each of the alignment apparatuses including, an elongated rod having threads along a portion of the rod, a first internally threaded cone adapted to connect to the rod in threaded engagement and a second internally threaded cone adapted to connect to the rod in threaded engagement, wherein one of the rods of is adapted to be fitted within a rear axle shaft of a motorcycle, and the other rod is adapted to be fitted within a swing-arm pivot shaft of the motorcycle.

In one implementation, the kit includes a ruler adapted to measure the distance between the rod ends when the rods are fixed within the axle and the swing-arm pivot shaft.

In still another aspect, the invention features a method for aligning the rear wheel and drive system of a motorcycle having a rear wheel axle and a swing arm pivot shaft, comprising inserting a first elongated threaded rod having a first end and a second end within the interior of the rear axle, connecting a first internally threaded cone in threaded engagement on one end of the first elongated threaded rod, connecting a second internally threaded cone in threaded engagement on the other end of the first elongated rod, tightening the first and second cones until the first rod is secured within the axle, inserting a second elongated threaded rod having a first end and a second end within the interior of the swing-arm pivot shaft, connecting a third internally threaded cone in threaded engagement on one end of the second elongated threaded rod, connecting a fourth internally threaded cone in threaded engagement on the other end of the second elongated rod and tightening the third and fourth cones until the second rod is secured within the swing-arm pivot shaft.

In one implementation, the method further includes measuring the distance between the first ends of the first and second rods.

In another implementation, the method further includes measuring the distance between the second ends of the first and second rods.

In another implementation, the method further includes comparing the distances between the first ends and the second ends.

In another implementation, the method further includes making adjustments to the rear axle until the distance between the first ends is equal to the distance between the second ends.

In another implementation, the method further includes removing the cones from the rods and removing the first rod from the axle and the second rod from the swing-arm pivot shaft.

In yet another aspect, the invention features a motorcycle alignment apparatus, including a rod adapted to be inserted to one of a rear axle and a swing arm pivot shaft and means for securing the rod within one of the rear axle or swing-arm pivot shaft.

One advantage of the invention is that it provides a reliable apparatus and method for aligning a rear wheel with the rest of the motorcycle including the frame and drive system.

Another advantage is that the invention uses a fixed point, the swing-arm pivot shaft to adjust variable points, the chain, and the rear wheel and axle.

Another advantage is that the apparatus is centered on the fixed and variable points so that accurate measurements can be taken.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 1 illustrates a view of an embodiment of an alignment apparatus connected to a motorcycle;

FIG. 2 illustrates a partial view of a motorcycle with the rear wheel out of alignment;

FIG. 3 illustrates a partial view of a motorcycle with the rear wheel in alignment;

FIG. 4 illustrates an embodiment of an alignment tool system;

FIG. 5 illustrates an embodiment of a threaded cone; and

FIG. 6 illustrates another embodiment of a threaded cone.

DETAILED DESCRIPTION OF THE INVENTION

Referring to the drawings wherein like reference numerals designate corresponding parts throughout the several figures, reference is made first to FIG. 1 that illustrates a view of an embodiment of two alignment apparatuses 125 connected to a motorcycle 100. A typical motorcycle 100 includes a rear wheel 105 attached to swing-arm 110, that is connected to a frame 102. A chain 124 is connected to the wheel 105 and connects to the drive system (not shown) of the motorcycle 100. The wheel 105 is connected to the swing-arm 110 on a rear wheel axle 120 that typically includes a nut 121 that secures the wheel 105 and axle 120 on the swing-arm 110. An axle 120 is typically a hollow cylinder that is externally threaded to receive the nut 121. The nut 121 typically has a hole in the middle, the hole aligning with the hollow interior of the axle 120. The swing-arm 110 is mounted to the frame 102 of the bike 100 on a swing-arm pivot shaft 115. The swing-arm 110 pivots on the pivot shaft 115 typically in the direction of arrows 111 during operation of the motorcycle 100. The swing arm 110 and the pivot shaft 115 are part of the suspension system of the motorcycle 100. The swing arm pivot shaft 115 is typically a hollow cylinder.

FIG. 1 also illustrates an embodiment of two alignment apparatuses 125, one affixed within the rear axle 120, and the other affixed within the pivot shaft 115. Each alignment apparatus 125 typically includes an elongated rod 126. The rod 126 is typically threaded along a portion of its length. In one embodiment, the entire rod 126 is threaded. The apparatuses 125 further include a first internally threaded cone 127. The cones 127 are internally threaded in a cylindrical hole that runs the length of the cones 127. The cones 127 are described in more detail below with respect to FIGS. 5 and 6. The cones 127 are adapted to connect the rods 126 in a threaded engagement where the threads on the rod 126 engage the internal threads of the cones 127. A similar threaded cone is adapted to engage the other end of the rod 126, which is not shown in FIG. 1.

One apparatus 125 is shown affixed to the pivot shaft 115. The rod 126 is shown located within the hollow interior of the pivot shaft 115. The threaded cone 127 is in threaded engagement with the rod 126 and is in contact with the outer edge of the pivot shaft 115. As described further below, the tapered sides of the cone 127 allow the cone 127 to fit snugly against the outer portion of the pivot shaft 115. The rod 126 of the second apparatus 125 is located within the hollow interior of the axle 120. The threaded cone 127 has not yet been connected to the rod 126. As described further below, the tapered sides of the cone 127 allow the cone 127 to fit snugly against the nut 121.

Typically, the nut 121 of the rear axle 120 can be loosened and the entire axle can be adjusted along a precut trench 130 on the swing-arm pivot shaft 110. Often, the manufacturer includes pre-marked notches that can be aligned with the nut axle 120 and nut 121 as the axle 120 is adjusted along the trench 130. The trench 130 is typically long enough to have a wide range of adjustment when the rear wheel is removed or the chain 124 is adjusted along the trench 130.

The apparatuses 125 are typically constructed of a sturdy and durable material such as steel and aluminum. It is understood that other suitable materials can be used.

Alignment System and Method

Typically, two of the apparatuses 125 described above can be used in conjunction as illustrated in FIG. 1 to be used as an alignment system.

FIG. 2 illustrates a partial view of a motorcycle 100 with the rear wheel 105 out of alignment. The rear wheel 105 is shown grossly out of alignment for illustrative purposes. As described above, the rear wheel 105 can become misaligned for many reasons. One rod 126 of one of the apparatuses 125 can be inserted into the interior of the axle 120. The threaded cones 127 are screwed onto the rod 126, with the tip of the cone 127 closest to the motorcycle 100. In an implementation, the cones 127 are manually tightened. The cones 127 have a wide base and tapered sides that come to a tip. The tip typically partially inserts into the nut 121 and possibly into the axle 120 as the cones 127 are screwed onto the rod 126. As the cone 127 partially inserts it is secured against the nut 121. As both cones 127 are secured on both sides of the axle 120, the rod 126 becomes substantially centered within the axle 120. The tapered sides allow symmetric insertion of the tips into the axle 120, therefore centering the rod 126 within the axle 120. Since the tips of the cones 127 are adapted to enter the nut 121 and the interior of the axle 120, their orientation is typically the opposing cones 127 face each other with their tips closest to each other.

Similarly, another rod 126 of another apparatus 125 is inserted into the hollow interior of the pivot shaft 115. Two threaded cones 127 are screwed onto the rod 126 on both sides of the pivot shaft 115. When the threaded cones 127 are screwed onto the rod 126, the tips of the cones 127 partially enter the interior of the pivot shaft 115 and are secured onto the shaft 115. As the cones 127 are tightened, the rod 126 is substantially centered within the shaft 115. Once again, the tapered sides allow symmetric insertion of the tips into the pivot shaft 115, therefore centering the rod within the pivot shaft 115. Since the tips of the cones 127 are adapted to enter the interior of the pivot shaft 115, their orientation is typically the opposing cones 127 face each other with their tips closest to each other.

Typically, the lengths of the two rods 126 are substantially equal. The rods 126 are positioned within the axle 120 and the pivot shaft 115 so that the ends of the rods stick out of either side of the axle 120 and the pivot shaft 115 at substantially the same distances, so that D is substantially equal to E, and F is substantially equal to G. When the rear wheel is out of alignment, the distance A and B are typically not equal, often times as little as millimeters. In many motorcycles like motorcycle 100, the pivot shaft 115 is fixed within the frame 102, which is fixed with respect to the drive system. This the pivot shaft 115 can operate as a fixed point to which the rear axle 120, which is variable along the trench 130 (see FIG. 1), can be adjusted.

FIG. 3 illustrates a partial view of a motorcycle 100 with the rear wheel in alignment. As mentioned above, the rear axle 120 is adjusted within the trench 130 and the nuts 121 tightened so that the distances between the rods 126 on both sides of the motorcycle 100 are equal, a distance C.

FIG. 4 illustrates an embodiment of an alignment tool system 160. An embodiment of an alignment system 160 can be further defined by adding rulers 140. As described with respect to FIGS. 2 and 3, the distance between the ends of the rods 126 are made equal. When the distance is equal, C, the rear wheel 105 is in alignment with the rest of the pivot shaft 115, the frame 102 and the entire motorcycle 100. In order to calculate the distance easily, an actual measurement can be made on both ends of both rods 126 with rulers 140. As described above, both rods 126 are centered with the respective axle 120 and pivot shaft 115. Therefore, a measurement made on both sides of the motorcycle from the center of the rod's end to the centers of the other rod's end can be made. Necessary adjustments to the rear axle 120 can then be made as needed until an equal distance on both sides is attained.

Although rulers have been shown to measure the distance between the rod ends, it is understood that other measurement devices can be used. For example, a tape measure or string can be used. In more sophisticated embodiments, laser measurements can be made. It is understood that other measurement techniques can also be used, and is not limited to those listed above.

Since the diameters of the rear axles and pivot shafts of motorcycles can vary, the alignment apparatuses can include rods that have different diameters. FIG. 4 illustrates that apparatus 125a includes a rod 126a having a smaller diameter than the rod 126b in apparatus 125b. Correspondingly, the threaded cones 127a have a smaller hole diameter than the hole diameter of cones 127b. The diameters of the rods 126a, 126b and the holes in the cones 127a, 127b can be determined as needed. Depending on the particular motorcycle, different alignment kits can be assembled that include rods and cones with appropriate diameters.

FIG. 5 illustrates an embodiment of a threaded cone 127a. The internal threads 129a of the cone 127a are located within a hole 128a that runs the length of the cone 127a. The hole 128a is typically a cylindrical tunnel. The internal threads 129a can run the entire length of the hole 128a or run a portion of the length. The threaded cone 127a includes a conical portion 150a and a cylindrical portion 151a with tapered sides. The cylindrical portion 151a typically includes a series of grooves 152a along the perimeter of the cylindrical portion 151a. FIG. 5 illustrates the grooves 152a in a waffled pattern. It is understood that other groove shaped can be provided. The grooves 152a provide a surface in which the operator of the system can obtain a good grip on the cone 127a when manually screwing the cone 127a on its respective rod.

FIG. 6 illustrates another embodiment of a threaded cone 127b. The internal threads 129b of the cone 127b are located within a hole 128b that runs the length of the cone 127b. The hole 128b is typically a cylindrical tunnel. The hole 129b of cone 127b has a larger diameter than the cone 127a in FIG. 5. As described above, different diameters may be necessary to accommodate the differing diameters of the axles and pivot shafts of different motorcycles. The internal threads 129b can run the entire length of the hole 128b or run a portion of the length. The threaded cone 127b includes a conical portion 150b and a cylindrical portion 151b with tapered sides. The cylindrical portion 151b typically includes a series of grooves 152b along the perimeter of the cylindrical portion 151b. FIG. 6 illustrates the grooves 152b in a waffled pattern. It is understood that other groove shaped can be provided. The grooves 152b provide a surface in which the operator of the system can obtain a good grip on the cone 127b when manually screwing the cone 127a on its respective rod.

Although the threaded cones have been shown above to secure the threaded rod within the rear axle and the swing arm pivot shaft, it is understood that the shape of the cones can be changed and still serve to secure the rod within the shaft. Typically, a replacement for the cones has to be able to fit within the nut of the rear axle and within a portion of the interior of the axle as well as the pivot shaft in a centered and symmetric manner. Therefore, other embodiments typically include bodies that have symmetric tapered sides. Other symmetric shapes can be included.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. An Alignment apparatus, comprising:
   an elongated rod having threads along a portion of the rod;
   a first internally threaded cone connected to the rod; and
   a second internally threaded cone connected to the rod and in opposition to the first internally threaded cone, wherein the internal threads of each of the cones runs the entire length of a hole that runs the entire length of the cone.

2. The apparatus as claimed in claim 1, wherein the cones are in threaded engagement with the rod.

3. The apparatus as claimed in claim 1, wherein the rod is threaded along its entire length.

4. The apparatus as claimed in claim 1, wherein each of the cones include a conical portion and a cylindrical portion, the cylindrical portion including a series of grooves along the perimeter of the cylindrical portion.

5. An alignment system, comprising:
   a first alignment apparatus; and
   a second alignment apparatus, each of the alignment apparatuses including,
   an elongated rod having threads along a portion of the rod;
   a first internally threaded cone connected to the rod; and
   a second internally threaded cone connected to the rod and in opposition to the first threaded cone, wherein the internal threads of each of the cones runs the entire length of a hole that runs the entire length of the cone.

6. The system as claimed in claim 5 the diameters of the rods of the first and second apparatuses are equal.

7. The system as claimed in claim 5 wherein the diameters of the rods of the first and second apparatuses are not equal.

8. An alignment tool kit, comprising:
   a first alignment apparatus; and
   a second alignment apparatus, each of the alignment apparatuses including,
   an elongated rod having threads along a portion of the rod;
   a first internally threaded cone adapted to connect to the rod in threaded engagement; and
   a second internally threaded cone adapted to connect to the rod in threaded engagement, wherein one of the rods of is adapted to be fitted within a rear axle shaft of a motorcycle, and the other rod is adapted to be fitted within a swing-arm pivot shaft of the motorcycle.

9. The kit as claimed in claim 8 further comprising a ruler adapted to measure the distance between the rod ends when the rods are fixed within the axle and the swing-arm pivot shaft.

10. A method for aligning the rear wheel and drive system of a motorcycle having a rear wheel axle and a swing arm pivot shaft, comprising:
   inserting a first elongated threaded rod having a first end and a second end within the interior of the rear axle;

connecting a first internally threaded cone in threaded engagement on one end of the first elongated threaded rod;

connecting a second internally threaded cone in threaded engagement on the other end of the first elongated rod;

tightening the first and second cones until the first rod is secured within the axle;

inserting a second elongated threaded rod having a first end and a second end within the interior of the swing-arm pivot shaft;

connecting a third internally threaded cone in threaded engagement on one end of the second elongated threaded rod;

connecting a fourth internally threaded cone in threaded engagement on the other end of the second elongated rod; and tightening the third and fourth cones until the second rod is secured within the swing-arm pivot shaft.

11. The method as claimed in claim 10 further comprising measuring the distance between the first ends of the first and second rods.

12. The method as claimed in claim 11 further comprising measuring the distance between the second ends of the first and second rods.

13. The method as claimed in claim 12 further comprising comparing the distances between the first ends and the second ends.

14. The method as claimed in claim 13 further comprising making adjustments to the rear axle until the distance between the first ends is equal to the distance between the second ends.

15. The method as claimed in claim 14 further comprising removing the cones from the rods and removing the first rod from the axle and the second rod from the swing-arm pivot shaft.

* * * * *